United States Patent [19]

Baker et al.

[11] Patent Number: 4,468,792
[45] Date of Patent: Aug. 28, 1984

[54] METHOD AND APPARATUS FOR DATA TRANSMISSION USING CHIRPED FREQUENCY-SHIFT-KEYING MODULATION

[75] Inventors: Lewin T. Baker; Sanjay K. Bose, both of Schenectady; George W. Ellis, Burnt Hills; Charles M. Puckette, Scotia, all of N.Y.

[73] Assignee: General Electric Company, Schenectady, N.Y.

[21] Appl. No.: 301,706

[22] Filed: Sep. 14, 1981

[51] Int. Cl.³ .............................................. H03K 7/06
[52] U.S. Cl. ......................................... 375/45; 375/1; 340/310 R
[58] Field of Search .................. 375/1, 23, 45, 62, 79, 375/80, 88, 97, 98, 122; 332/16 R; 340/825.58, 310 A, 310 R; 179/15.55; 455/29; 381/29, 31

[56] References Cited

U.S. PATENT DOCUMENTS

| | | | |
|---|---|---|---|
| 3,484,693 | 12/1969 | Fong | 375/1 |
| 3,493,865 | 2/1970 | Miller | 375/1 |
| 3,691,464 | 9/1972 | Dayton et al. | 375/1 |
| 3,777,269 | 12/1973 | Brady | 375/67 |
| 3,824,466 | 7/1974 | Olier et al. | 375/45 |
| 4,209,750 | 6/1980 | Freitas et al. | 375/1 |
| 4,312,072 | 1/1982 | Vogel | 375/1 |

Primary Examiner—Jin F. Ng
Assistant Examiner—Stephen Chin
Attorney, Agent, or Firm—Geoffrey H. Krauss; James C. Davis, Jr.; Marvin Snyder

[57] ABSTRACT

A method for transmission of digital data utilizes a carrier frequency offset in a first frequency direction for a first binary condition, and offset in a second frequency direction for the remaining binary condition, at the start of a bit time interval. The carrier frequency is swept in a preselected frequency direction during each bit time interval, to produce a chirped frequency-shift-keyed waveform in the frequency domain, for transmission of each bit of binary data. Frequency-shift-keyed demodulation is utilized at a receiving end, with the receiver synchronized to the transmitter bit time interval, to recover the transmitted digital data. Apparatus for data transmission using this chirped frequency-shift-keyed modulation waveform is disclosed.

54 Claims, 6 Drawing Figures

METHOD AND APPARATUS FOR DATA TRANSMISSION USING CHIRPED FREQUENCY-SHIFT-KEYING MODULATION

BACKGROUND OF THE INVENTION

The present invention is related to digital data transmission methods and apparatus and, more particularly, to a novel method and apparatus for data transmission using chirped frequency-shift-keying modulation.

Data communications over media (such as power lines and the like) having severe noise characteristics presents unique problems. Data transmission over such media suffer from Gaussian noise as well as corruption by unusual noise phenomena, such as high voltage spikes (caused by switching transients) and CW carriers arising from other communications equipment and other sources. Such noise sources adversely affect signal-to-noise ratio and often lead to unacceptably high error rates. Most power line data communication systems concentrate primarily on Gaussian noise reduction, even though such Gaussian noise is not the major noise phenomena typically observed in power line communications. One modulation scheme commonly used for data communications is frequency-shift-keying (FSK) modulation. With optimal receiver design, the FSK technique can be relatively successful and immune to Gaussian noise. Use of FSK modulation is, however, very highly sensitive to CW interference at a few specific frequencies, the occurrence of which CW signals causes a jamming effect and often prevents successful communication. Further, schemes for transmitting FSK modulated data signals often require that the data be transmitted at relatively low bit rates, often at harmonic, or subharmonic, relationships to the power line frequency. It is therefore highly desirable to provide a modulation form capable of allowing data transmission of many hundreds of bits per second, over a noisy media, such as the power line, which media may have undesirable transient and continuous frequency components, while maintaining a relatively low error rate for such data transmission.

BRIEF SUMMARY OF THE INVENTION

In accordance with the invention, a method for transmission of binary digital data over a transmission medium, uses a waveform having a frequency swept in a chosen direction, either increasing or decreasing, during the time interval during which a bit of information is transmitted. An initial carrier frequency is offset in a selected one of first and second directions responsive to the particular logic value of the data bit to be transmitted, with the swept frequency direction being identical for either data value.

In one presently preferred method for transmitting digital data by the above-described chirped frequency-shift-keying (CFSK) modulation, a logic-one condition is transmitted with an initial frequency greater than a central frequency and a logic-zero bit condition is transmitted with an initial frequency less than the center frequency; the swept frequency increases, in substantially linear manner, from the initial frequency, with respect to time, during each bit time interval.

In apparatus for transmitting and receiving the CFSK modulated waveform, both transmitter and receiver are synchronized to a common system-wide signal, such as the zero crossings of the power line frequency waveform when the power line is the transmission media. A data transceiver for use in such a system utilizes: clock means for providing timing information responsive to the power line waveform zero crossings; transmission modulating means for providing a chirped FSK waveform responsive to the data value of each data bit; means for amplifying the modulator output and for coupling the amplified waveform to the transmission medium; receiver means for coupling the medium to a receiver front end means and thence to a chirped FSK demodulator means for retrieving the binary data values from the swept frequency waveforms on the transmission media.

Accordingly, it is one object of the present invention to provide a novel method for transmitting data over media having a high content of potentially-interfering signals.

It is another object of the present invention to provide novel apparatus for transmitting digital data utilizing chirped frequency-shift-keyed modulation.

These and other objects of the present invention will become apparent upon consideration of the following detailed description, when taken in conjunction with the drawings.

DETAILED DESCRIPTION OF THE INVENTION

Figure 1A:
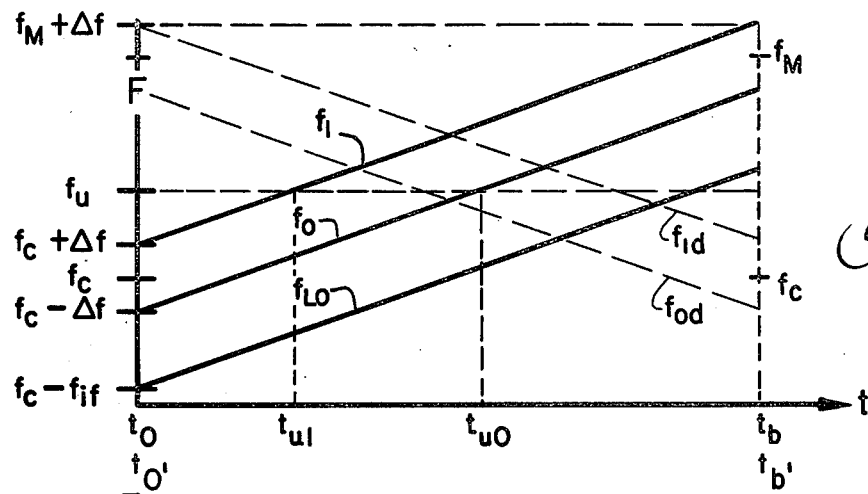
FIGS. 1a and 1b are graphical illustrations of the relationship between carrier and intermediate frequencies, respectively, during the time interval necessary to transmit one bit of binary data utilizing the method of the present invention.
Figure 1B:
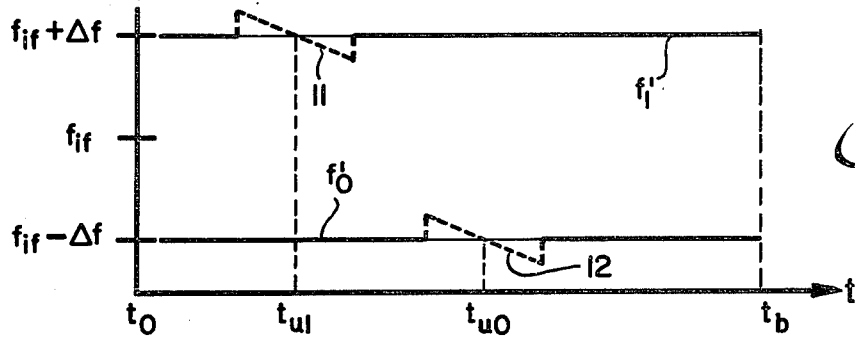

Referring initially to FIGS. 1a and 1b, each bit of binary data to be conveyed along a transmission medium is transmitted, in an associated bit time interval from a bit start time $t_0$ to a bit end time $t_b$, as a swept, or ramped, frequency waveform. Given a desired transmission center frequency $f_c$, a first binary condition is transmitted by offsetting the initial frequency (at time $t_0$) of the ramped frequency waveform by a predetermined offset frequency $\Delta f$ in a first frequency direction, while the remaining binary condition is transmitted by initially offsetting the ramp waveform swept frequency by the same amount $\Delta f$ in the opposite frequency direction. The frequency may be swept to increasing or decreasing instantaneous values with increased time during the bit-time interval, and the binary one or zero condition may be the condition offset with increased frequency, as desired for a particular system. FIG. 1a illustrates the use of increasing frequency with time, and $+\Delta f$ offset for the binary one condition. Thus, with a transmission channel established by some preselected center frequency $f_c$, a binary one bit is transmitted by sending the instantaneous frequency $(f_c+\Delta f)$, at the bit interval start time $t_0$, and thereafter transmitting a linearly increasing frequency, with linearly increasing time, until a maximum frequency $(f_M+\Delta f)$ is reached at the bit interval end time $t_b$. The binary one bit instantaneous frequency $f_1$ is therefore given by the relationship:

$$f_1 = (f_c+\Delta f)+(f_M-f_c)(t-t_0)/(t_b-t_0).$$

Similarly, a binary zero condition is transmitted by an increasing frequency waveform having the same rate of frequency increase with respect to an increase in time, but starting at a negative offset from the center frequency, i.e. with an initial start frequency of $(f_c-\Delta f)$. Therefore, the binary zero instantaneous frequency $f_0$ is given by the relationship:

$$f_0 = (f_c-\Delta f)+(f_M-f_c)(t-t_0)/(t_b-t_0).$$

As previously mentioned hereinabove, the carrier frequency may also be swept to decrease the instantaneous values with increased time during a bit time interval; the binary 1 condition (e.g. as shown by broken frequency line $f_{1d}$) or the binary 0 condition (e.g. as shown by broken frequency line $f_{2d}$) may be the condition offset with decreasing frequency, for a particular system. The direction in which the common frequency is swept during one bit time interval (e.g. upward during a first bit time interval, from time $t_0$ to time $t_b$) may be opposite to the swept carrier frequency direction (e.g. downward, as shown by the broken swept frequency lines) in a next bit time interval e.g. from time $t_0'=t_b$ to a time $t_b'=2t_b$), or vice versa.

The resulting data transmission method, due to the offset from center frequency responsive to the particular data condition, and the change of instantaneous frequency with respect to time, will be herein referred to as chirped frequency-shift-keying (CFSK) modulation.

The transmission media and associated transmission and reception equipment must be selected for operation over the frequency range from the minimum frequency $(f_c-\Delta f)$ to the maximum frequency $(f_M+\Delta f)$, for the increasing CFSK modulation illustrated.

Because the carrier channel frequency $f_c$ may be varied, and because more than one channel may be simultaneously used in a communication system, it is advantageous to frequency-convert the CFSK waveform to a common intermediate frequency. It is also highly desirable, in terms of providing relatively simple, common i−f amplification and frequency-shift-keyed signal demodulation, to utilize a fixed i−f center frequency $f_{if}$ (FIG. 1b). Therefore, the CFSK waveform must be mixed with a similarly chirped local-oscillator waveform frequency $f_{LO}$ (FIG. 1a). As illustrated, the local oscillator frequency is offset to the lower frequency side of the channel center frequency $f_c$, whereby the local oscillator frequency $f_{LO}$ starts, at bit interval start time $t_0$, at initial frequency $(f_c-f_{if})$ and linearly increases at the same rate as the increase in either of the $f_0$ or $f_1$ bit frequency chirps, to reach a maximum LO frequency at bit interval end time $t_b$. It should be understood that all of the frequency chirps return, in the illustrated case, to the minimum frequency thereof at each subsequent bit time interval end time $t_b$.

Therefore, the intermediate frequency waveform will be either one of two fixed frequencies during the bit time interval from start time $t_0$ to end time $t_b$. If a binary one is illustratively transmitted, the difference between the chirped binary one frequency and the chirped LO frequency will provide a binary one i−f frequency $f'_1$ of $(f_{if}+\Delta f)$, offset above the i−f center frequency $f_{if}$, by the chirp offset frequency $\Delta f$; transmission of a binary zero signal will provide an i−f frequency $(f_{if}-\Delta f)$ offset below the center i−f frequency by the offset frequency $\Delta f$. Each of the binary one and binary zero center frequencies will, in the ideal case, remain constant during that bit time interval when present.

As previously set forth hereinabove, the wellknown frequency shift keying method of modulation provides constant frequency transmission and i−f signals, which are extremely susceptible to CW noise sources at frequencies at, or close to, either of the frequency-shift-keyed frequencies, i.e. the noise source frequency is falsely interpreted by the receiver as being transmission of the closest data-condition frequency. The CFSK method provides greater immunity to CW interfering signals. An extraneous ("noise") signal may be present, at an undesired signal frequency $f_u$. As the CFSK modulation is transmitted as two variable-frequency patterns, instead of tones at two frequencies, and the frequency pattern is periodic over an integral number of bits, with the pattern being known to both the transmitter and receiver, any interfering CW signal which lies in the frequency region, from $(f_c-\Delta f)$ to $(f_M+\Delta f)$, is encountered for only a brief portion of the bit time interval by either, or both, of the CFSK waveforms.

If the undesired frequency $f_u$ is encountered by both the binary one condition chirp waveform $f_1$, at time $t_{u1}$, and, because of the selected negative frequency offset for the binary zero condition, at a later time $t_{u0}$, then the i−f waveforms would have frequency deviational waveforms 11 and 12, respectively, for the frequency-converted logic-one condition and the logic-zero condition frequencies $f'_1$ and $f'_0$, respectively. Thus, the undesired CW signal will have equal frequency effects on both the logic-one and logic-zero signals, and will have equal amplitude effect thereon when integrated and subsequently sampled at the end of a bit time interval, i.e. near bit interval end time $t_b$. The effect of the undesired frequency signal is thus essentially cancelled by a comparison process.

If the undesired CW signal lies in a frequency region traversed by the chirp of only one logic condition, but not the other, the effect would not be cancelled completely, but would be decreased by a factor corresponding to the ratio of the frequency range swept and the i−f filter bandwidth, with a gain term corresponding to the number of times a particular chirp logic condition waveform encounters the undesired signal while the other logic condition chirp waveform does not. Accordingly, by use of a relatively sharp intermediate frequency filter and a relatively wide frequency sweep chirp for each bit, the effect of a single chirp crossing of undesirable frequency can be greatly reduced. In the apparatus embodiment to be described hereinbelow, a center frequency $f_c$ of 100 KHz. is utilized with an offset frequency $\Delta f$ of 5 KHz., and with the frequency sweep being on the order of magnitude of the center frequency, e.g. a frequency sweep of 100 KHz., for example, between the start and end frequencies for each bit chirp. Thus, a logic-one bit chirp starts at a frequency $(f_c+\Delta f)$ of 105 KHz. and ends at a frequency $(f_M+\Delta f)$ of 205 KHz., while a logic-zero bit chirp starts at a frequency ($f_c - \Delta f$) of 95 KHz. and ends at a frequency 100 KHz. higher (e.g. an ending frequency of 195 KHz.)

Figure 2:
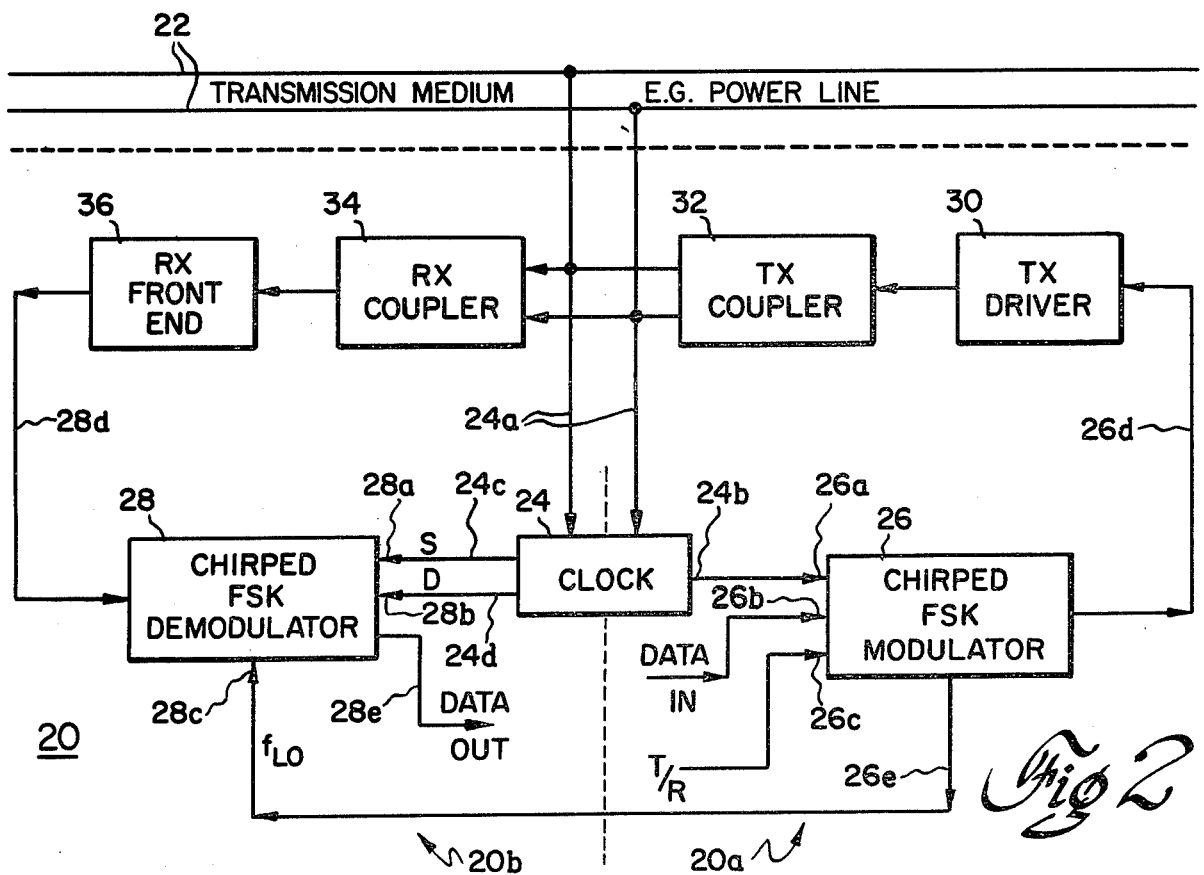
FIG. 2 is a block diagram of a data transceiver, for transmission and reception of data conveyed on a power line transmission medium.

Referring now to FIG. 2, a data transceiver 20 for transmitting and receiving the chirped frequency-shift-keyed modulation over a particular transmission medium 22, e.g. a residential power line, includes clock means 24 for providing the synchronization between a transmitter oscillator and a receiver local oscillator frequency chirp sweep, as required for proper transmission and reception of the CFSK modulation. In the particular embodiment shown, the zero crossings of the power line frequency (60 Hz. in the United States) are utilized to obtain the required synchronization. This fixes the data word rate at 60 wps.; if a 16-bit word is utilized, each bit time interval (from start time $t_0$ to end time $t_b$) is slightly greater than 1 millisecond. Thus, clock means 24 receives power and zero crossing information by connection of input 24a thereof to power line 22. A first clock means output 24b provides transmitter CFSK modulator timing information to a first input 26a of a chirped frequency-shift-keying modulator means 26 in a transmitter section 20a. Other clock means outputs 24c and 24d respectively provide sample S and dump D signals, respectively, to respective inputs 28a and 28b of a chirped frequency-shift-keyed signal demodulator means in a receiver section 20b of transceiver 20.

The transmitter section 20a includes CFSK modulator means 26, which also receives data to be transmitted at a DATA IN data input 26b and a transmit-receive signal T/R at a control input 26c. Modulator means 26 provides the frequency chirped waveform (of FIG. 1a) with start and end frequencies determined by the logic state of the signal at data input 26b. This waveform appears at a first output 26d and is connected, through a transmit power amplifier/driver means 30 and transmission coupler 32, to power line 22 for transmission of data to other transceivers 20 connected to the transmission media. Modulator means 26 provides a local oscillator output 26e, having the chirped local oscillator waveform $f_{LO}$, for use by receiver demodulator means 28, responsive to input 26c being in the receive (R) condition.

The receiver CFSK demodulator means 28 receives the chirped local oscillator waveform, at an input 28c, from CFSK modulator means output 26e in transmitter subsection 20a. The chirped frequency signal from media 22 is coupled, via a receive coupler means 34, to a receiver front end means 36, having sufficient gain, dynamic range, filtering and the like properties, to provide a detectable intermediate-frequency signal to the chirped FSK demoduator i−f input 28d. Demodulator means 28 may advantageously use an integrate, sample and dump subcircuit for detection of the received data. The binary data detected by CFSK demodulator means 28 is provided at a data output 28e thereof, for subsequent use by apparatus external to data transceiver 20.

Figure 3A:
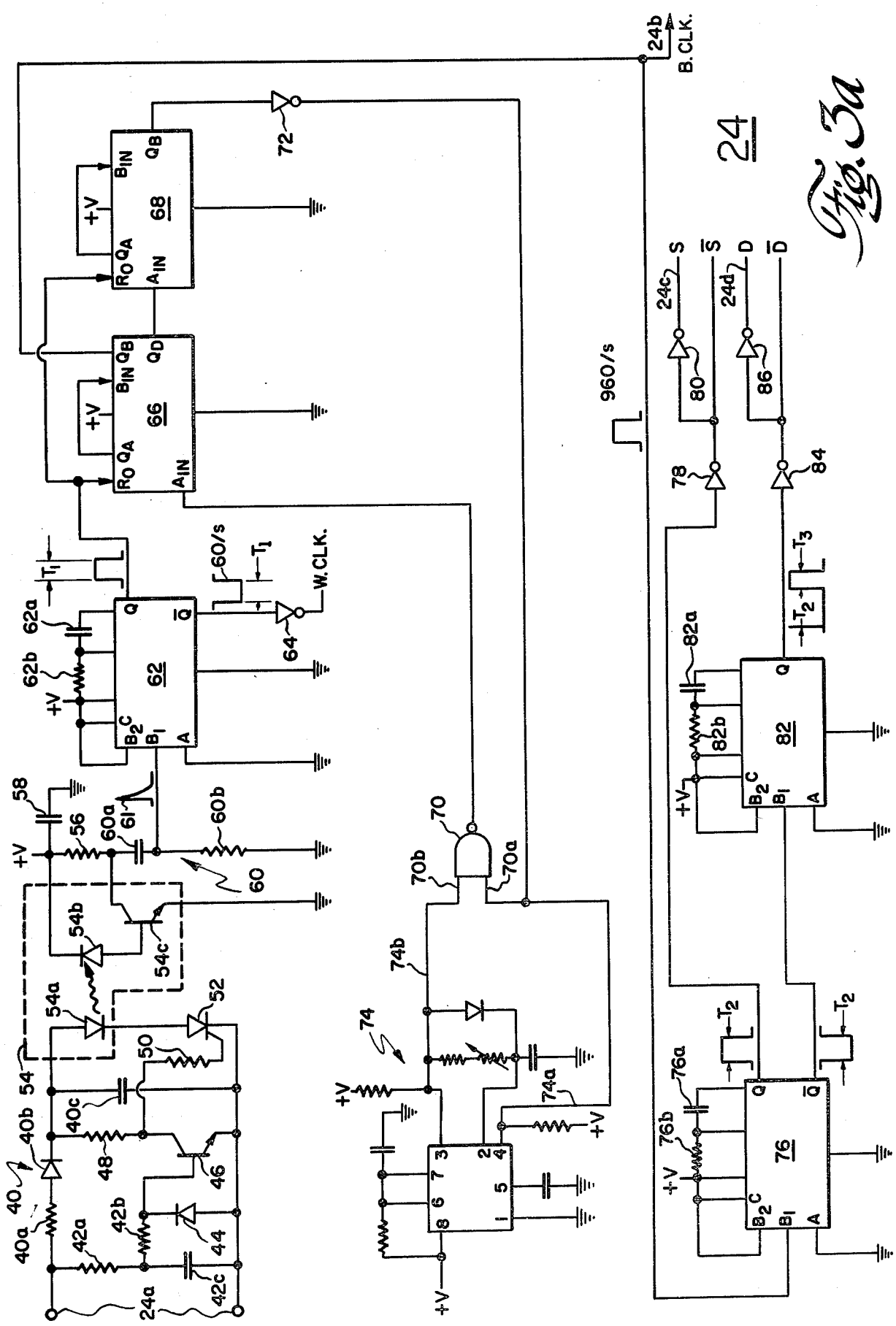
FIG. 3a is a schematic diagram of one presently preferred embodiment of clock circuitry for use in the transceiver of FIG. 2.

Referring now to FIG. 3a, clock means 24 receives a 60 Hz. power line sinewave from power line media 22. A power supply circuit 40, consisting of a series-connected resistance 40a, diode 40b and filter capacitance 40c, is connected across the line to supply a positive operating voltage at the junction between diode 40b and capacitance 40c. The sinusoidal voltage at one side of the power line media is applied via a pair of series resistance elements 42a and 42b, having a capacitive element 42c from the junction therebetween to the opposite side of the power line, across a negative-peak-clipping diode 44. The diode is connected across the base-emitter junction of a switching transistor 46, having the collector electrode thereof connected through a resistance 48 to the positive potential at the junction between diode 40b and capacitance 40c. A series resistance element 50 is connected between the collector of transistor 46 and the gate of a silicon-controlled rectifier 52, having the cathode thereof connected to the same side of the line as the emitter of transistor 46 and the anode of diode 44. The anode of SCR 52 is series connected with a light-emitting diode 54a, which is part of an optoelectronic isolator means 54, to the positive voltage supply of power supply means 40. Optoisolator 54 includes a photodetector diode 54b in series between a source of positive operating voltage +V and the base of a switching transistor 54c, which is also part of the optoisolator. The emitter electrode of transistor 54c is connected to ground, while the collector electrode thereof is connected through a load resistance 56 to operating potential +V. The operating potential supply is bypassed by a capacitance 58. A differentiator means 60 includes a capacitive element connected to the junction between resistance element 56 and the collector electrode of transistor 54c, and in series, to ground potential, with a resistance element 60b.

Current normally flows through diode 54a, due to SCR 52 being turned on when the power line voltage reaches some predetermined positive value after a zero crossing. The light emitted from diode 54a is received by detector 54b and causes transistor 54c to saturate. The output of differentiator means 60, at the junction between capacitance 60a and resistance 60b, is normally at ground potential. When a zero crossing occurs, SCR 52 turns off and the flow of current through diode 54a ceases. The cessation of optical radiation to diode 54b causes transistor 54c to cut off, whereby the collector voltage thereof abruptly increases substantially to operating potential +V. The rising edge is differentiated and applied, as a series of line-frequency pulses 61, to a $B_1$ input of a first mono-stable multivibrator means 62.

Mono-stable multivibrator means 62, which may be configured utilizing a standard TTL 74123 and the like integrated circuit, has a timing capacitance 62a and a timer resistance 62b connected thereto, such that the state of the true Q output and false $\overline{Q}$ output thereof are changed, from their normal resting level of substantially zero volts (hereinafter a logic-zero level) and substantially +V volts (hereinafter a logic-one level), respectively, to the opposite level, for a time interval $T_1$ (established by the values of capacitance 62a and resistance 62b), responsive to each positive pulse at the output of differentiator means 60, i.e. at a 60 pulse per second rate. The negative-going $T_1$ pulse at the $\overline{Q}$ output of multivibrator 62 is inverted by a buffer 64; the buffer output is a word clock W.CLK. positive-going pulse train at the 60 wps. rate previously referred to hereinabove.

The positive-going line-frequency pulse train at the Q output of first multivibrator 62 is applied to the reset-to-zero $R_0$ input of each of first and second four-bit shift-registers 66 and 68. Each of registers 66 and 68 may be implemented by standard TTL 7493 four-bit counter and the like integrated circuits. The first section $A_{in}$ input of first register 66 is connected to the output of a two-input NAND gate 70, while the first counting stage output $Q_A$ is connected to the next stage $B_{in}$ input of counter 66. The fourth stage $Q_D$ output of register 66 is connected to the first stage $A_{IN}$ and input of second register 68, which also has the $Q_A$ first stage output connected to the second stage $B_{IN}$ input thereof. The output $Q_B$ of the second stage of register 68 is connected to the input of an inverter 72, having the output thereof connected to one input 70a of NAND gate 70. An astable multivibrator subcircuit 74, utilizing a type 555 and the like integrated circuit and associated components, provides an oscillator, as well-known to the art, with a frequency set to a chosen multiple, e.g. four times, of the desired number of bits per second of a bit clock B.CLK. waveform, to be taken from the second stage ouput $Q_B$ of serial register 66. The output of multivibrator 74 is connected to the remaining input 70b of NAND gate 70.

In operation, at each positive-going zero crossing of the power line, a positive pulse at the Q output of first multivibrator 62 resets both of shift registers 66 and 68 to zero counts therein. The logic-zero level at the $Q_B$ output of register 68 appears as a logic-one level at gate input 70a and multivibrator reset input 74a, causing the multivibrator pulse train to re-start and also allowing the astable multivibrator output 74b pulses to pass through gate 70 and clock the divide-by-sixteen shift register 66. After 16 astable pulses have been counted, the state of the $Q_D$ output of register 66 changes and register 68 begins counting. As register 68 is configured as a divide-by-four counter, the state of the $Q_B$ output thereof changes for every 64 output pulses from astable multivibrator 74. The change of output state is inverted and opens gate 70, whereby astable output pulses are not applied to the first stage input of register 66 until the next reset pulse is applied to the $R_0$ inputs of registers 66 and 68. The frequency of multivibrator 74 is adjusted to produce 64 pulses in the one-sixtieth of a second between each reset pulse, e.g. a multivibrator 74 frequency of 3840 Hz. A bit clock B.CLK. output 24b is taken at the output of the second stage of shift register 66, which output is a squarewave at one-fourth the nominal frequency of astable multivibrator 74, e.g. at 960 pulses per second, which is the product of the number of data bits per word, e.g. 16 bits per word, and the number of data words per second, e.g. 60 wps, to be used in the system. Thus, it will seen that the basic chirped frequency-shift-keyed modulation system is designed for relatively high bit rates (on the order of 1-2 kilobits per second) with relatively high immunity to interfering signals. It will also be seen that 1960 bits per second of data can be transmitted by utilizing 32 bit words (with the bit clock waveform being taken from the $Q_4$ output of register 66), or by transmitting 120 words of 16-bit length each, by causing multivibrator 62 to trigger at each zero crossing of the power line waveform, rather than only triggering on the positive-going zero crossings.

As previously mentioned, an integrate, sample and dump subcircuit is utilized for detection of each of the two binary condition i−f frequencies f'$_0$ and f'$_1$. The bit clock waveform leading edge is utilized to reset the demodulator integrators, as explained hereinbelow, and to derive the sample S and dump D timing intervals which occur just prior to that reset. The bit clock pulse train is applied to the positive-going trigger input $B_1$ of a second monostable multivibrator means 76. Normally, the true Q and false $\overline{Q}$ outputs of multivibrator 76 will be respectively at the logic-zero and logic-one levels, when the multivibrator has timed out. Upon application of a positive-going edge to the $B_1$ input, the Q output goes to a logic-one level and the $\overline{Q}$ output goes to a logic-zero level, both for identical time intervals $T_2$, determined by the values of a timing capacitance 76a and a timing resistance 76b connected to the second multivibrator. The Q output is inverted by inverting buffer 78, and the output thereof is an inverted-sample $\overline{S}$ signal; another inverter 80 re-inverts the output of inverter 78 to provide a buffered sample S output. The negative-going $\overline{Q}$ pulse is applied to a B1 input of a third monostable multivibrator 82. The Q output thereof is normally at the logic-zero level, but is switched to the logic-one level, for a time interval $T_3$ (determined by the magnitudes of a timing capacitance 82a and a timing resistance 82b) responsive to the positive-going edge of the signal at the B1 input, which rising edge occurs at the end of the output timing interval $T_2$ of the previous second multivibrator 76. The positive Q output pulse is inverted by a first inverter 84 to provide a detector dump-false $\overline{D}$ signal; another inverter 86 re-inverts the output of inverter 84 to provide a buffered detector dump-true D output.

Figure 3B:
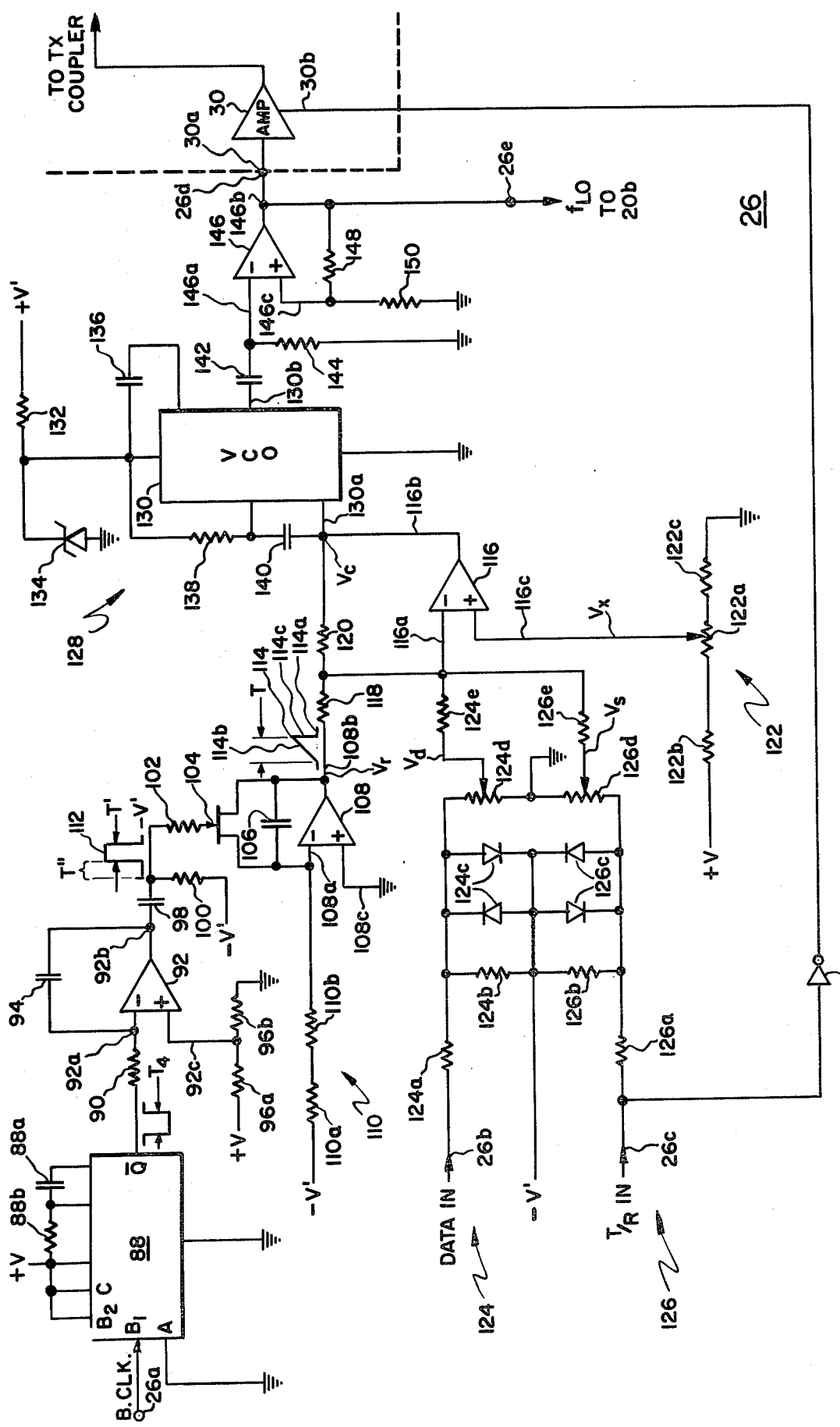
FIG. 3b is a schematic diagram of one presently preferred embodiment of a chirp FSK modulator and transmission driver, for use in the transceiver of FIG. 2.

Referring now to FIG. 3b, chirp frequency-shift-key transmission modulator 26 receives: the bit clock B.CLK. signal at input 26a from clock means 24; a transmit-receiver T/R IN signal at input 26c; and a binary digital data input signal DATA IN at input 26b, only when data is to be transmitted. The bit clock B.CLK. signal is applied to the $B_1$ positive-going trigger input of a fourth monostable multivibrator 88. The false $\overline{Q}$ output thereof is normally at a logic-one level, but, responsive to a positive-going edge at the $B_1$ input, falls to a logic-zero level, and remains at the logic-zero level for a time interval $T_4$, as established by the values of a timing capacitance 88a and a timing resistance 88b coupled to fourth monostable multivibrator 88. Thus for each bit time interval, e.g. 1/960-th second, a logic-zero pulse of duration $T_4$ is generated. The $T_4$ length pulse is applied through an input resistance 90 to the inverting-input 92a of an operational amplifier 92. A relatively small value integrating capacitance 94 is connected between inverting input 92a and the output 92b of this first operational amplifier. The operational amplifier non-inverting input 92c is connected to the midpoint of a voltage divider 96, which may be a 2:1 divider comprised of substantially-equal-value resistance elements 96a and 96b which are series-connected between operating potential +V and ground potential. The operational amplifier output 92b is connected through a coupling capacitor 98 to a first terminal of a resistance 100 having its remaining terminal coupled to negative-polarity operating potential −V'. The first terminal of resistance 100 is also connected through a gate resistance 102 to the gate electrode of a first switching device 104, e.g. a field-effect transistor. The source-drain circuit of device 104 is connected across an integrating capacitor 106 and between the inverting −input 108a and output 108b of a second operational amplifier 108. Inverting input 108a is connected through a series resistance 110 (preferably comprised of a fixed resistance 110a and a variable resistance 110b in series connection) to the negative-polarity operating potential −V'. Operational amplifier non-inverting +input 108c is connected to ground potential.

In operation, first operational amplifier 92 acts as a pulse polarity-inverting and level-shifting delay means, whereby a pulse 112 appears, at the junction of capacitance 98 and resistances 100 and 102, with a resting level of −V' volts, a peak level established by the peak voltage of the input pulse from multivibrator 88, and a pulsewidth T' established, in part, by the relatively small feedback capacitance 94. In the illustrated embodiment, pulsewidth T' is on the order of 10 microseconds and occurs after a time interval T" sufficient to allow at least the sample S pulse to have been completed immediately therebefore. Pulse 112 is utilized to place device 104 in saturation during time interval T', but render device 104 in the cutoff condition between pulses 112. At each pulse 112, therefore, the saturated device 104 discharges integrating capacitance 106, whereby second operational amplifier output 108b is reset, i.e. the voltage thereat falls to some D.C. level 114a. After the falling edge of pulse 112 occurs, a relatively high resistance is in parallel with capacitor 106 and second operational amplifier 108 is enabled to function as an integrator, providing a linearly rising ramp portion 114b, with a slope set by the value of total resistance 110. Upon the occurrence of next pulse 112, the rising portion 114b of the waveform is terminated and the waveform 114 abruptly decreases, at trailing edge 114c, to the reset level 114a, preparatary to producing another ramp portion 114b when device 104 is again placed in the cut-off condition.

A third operational amplifier 116 is utilized as an inverting adder, with a first input resistance 118 being connected between second operational amplifier output 108b and third operational amplifier inverting −input 116a. A feedback resistance 120 is connected between input 116a and third operational amplifier output 116b. A frequency-adjustment network 122 is connected between operating potential +V, ground potential and the non-inverting +input 116c of the third operational amplifier. Network 122 may comprise a potentiometer 122a, having the wiper arm thereof connected to input 116c, and a pair of fixed resistance elements 122b and 122c connected from the potentiometer respectively to +V operating potential and to ground potential. The DATA IN signal and the T/R IN logic levels are connected through substantially similar networks 124 or 126 to third operational amplifier input 116a. Each of networks 124 or 126 include: a series resistance element 124a or 126a; a shunt resistance element 124b or 126b connected from the associated resistance 124a or 126a, respectively, to negative-polarity operating potential −V'; a pair of back-to-back protection diodes 124c or 126c connected from ground potential to the junction between resistance elements 124a and 124b, or 126a and 126b, respectively; a potentiometer 124d or 126d connected across the associated pair of diodes; and respective input resistances 124e or 126e connected between the associated potentiometer wiper arm and third operational amplifier input 116a.

A voltage-controlled oscillator (VCO) circuit means 128 utilizes a voltage-controlled oscillator integrated circuit, such as the LM566 integrated circuit available from National Semiconductor Co. and the like. A positive operating potential +V' is supplied through a series resistance 132 and a zener regulating diode 134, to integrated circuit 130. A center-frequency-determining capacitance element 136 and resistance element 138 are connected to the VCO integrated circuit 130, as is a frequency-modulation capacitance element 140. The third operational amplifier output 116b is also connected to a frequency-modulation control input 130a of the voltage-controlled oscillator. The frequency-modulated carrier provided at VCO output 130b is coupled through capacitance 142 to appear across a resistance element 144 and at the inverting-input 146a of a fourth operational amplifier 146. A feedback resistance 148 is connected between fourth operational amplifier output 146b and the non-inverting +input 146c thereof. A gain-setting resistance 150 is connected between input 146c and ground potential. The local oscillator output 26e signal for receiver portion 20b and the chirped frequency-shift-key modulator output 26d are both taken from fourth operational amplifier output 146b. Output 26b is connected to the input 30a of transmitter driver-amplifier 30. The T/R IN signal is connected through an inverter 152, to transmitter driver-amplifier control input 30b.

In operation, it is initially assumed that the transmitter is to be operative (a logic-zero level appears at the T/R IN input 26c) and that a logic-zero data bit is to be transmitted (a logic-zero level appears at the DATA IN input 26b). The presence of a logic-zero level at either input 26b or 26c causes a negative voltage to appear at the junction of the associated input divider portion of network 124 or 126, respectively, comprised of resistance elements 124a and 124b or 126a and 126b. At least one of diodes 124c or 126c conduct, whereby a negative voltage of relatively small magnitude (on the order of 0.6 volts) appears across the respective potentiometer 124d or 126d. The somewhat-smaller-magnitude negative voltages at the wiper arms thereof are the input signals $V_d$ and $V_s$ applied to respective inverting adder input resistances 124e and 126e, respectively. The ramp voltage $V_r$ waveform 114 is applied to input resistance 118. The resulting frequency-control voltage $V_c$, applied to VCO means 130, is therefore, at the start of the ramp waveform, given by:

$$V_c = k_1 V_s + k_2 V_d - k_3 V_r \pm k_4 V_x,$$

where V is the frequency-adjustment voltage applied to third operational amplifier input 116c, and the gain constants, $k_1$, $k_2$, $k_3$ and $k_4$ are established by the relative values of input resistances 118, 124e and 126e, and by the magnitude of feedback resistance 120. Thus, the frequency-adjustment voltage $V_x$ may be set for the desired starting frequency ($f_c - \Delta f$) of the data zero chirped-frequency sweep. As the ramp voltage $V_r$ increases, in ramp portion 114b, the control voltage $V_c$ magnitude decreases, and, in accordance with the control voltage-frequency relationship of the particular VCO means utilized, causes a corresponding increase in transmitter frequency. Thus, for transmission of a logic-zero data bit, $V_x$ is set for a starting frequency of 95 KHz. and the ramp input resistance 118 is set for a third operational amplifier gain such that the final frequency (immediately before the ramp waveform enters falling portion 114c) is 195 KHz.

For transmission of a logic-one data bit, the DATA IN input 26b receives a logic-one level. The voltage at the junction of resistances 124a and 124b is now more positive than that junction voltage would be for transmission of a logic-zero data bit. The data voltage $V_d$ input is now at a more-positive voltage, as set by the wiper arm position of potentiometer 124d, such that the initial frequency transmitted is ($f_c + \Delta f$), e.g. 105 KHz. As this positive-frequency offset voltage is continually added to the frequency control voltage $V_c$, the maximum transmitted frequency, immediately prior to ramp falling portion 114c, will be twice the offset frequency $\Delta f$ greater than the maximum frequency transmitted for a logic-zero; in the illustrated embodiment, this maximum frequency is, as previously mentioned hereinabove, 205 KHz.

For data reception, the T/R IN voltage at input 22b is a logic-one level, causing amplifier 30 to be turned off and also causing the voltage across potentiometer 126d to become more positive. Means (not shown) are utilized to prevent transmission data from reaching input 26b. The wiper arm of potentiometer 126d is adjusted to cause voltage $V_s$ to be of magnitude sufficient to shift the frequency control voltage $V_c$ such that the desired local oscillator swept-frequency chirp appears. In the illustrated embodiment, a receiver intermediate frequency ($f_{if}$) of 40 KHz. may be utilized, with the local oscillator chirp frequency being swept from ($f_c+f_{if}$) of 140 KHz. to a maximum LO frequency of 240 KHz. If desired, a relatively standard intermediate frequency, such as the 455 KHz. intermediate frequency utilized in AM broadcast radio receivers and the like, may be utilized. The local oscillator frequency may therefore be swept from an initial local oscillator frequency of 555 KHz., to a final local-oscillator frequency of 655 KHz.

Figure 3C:
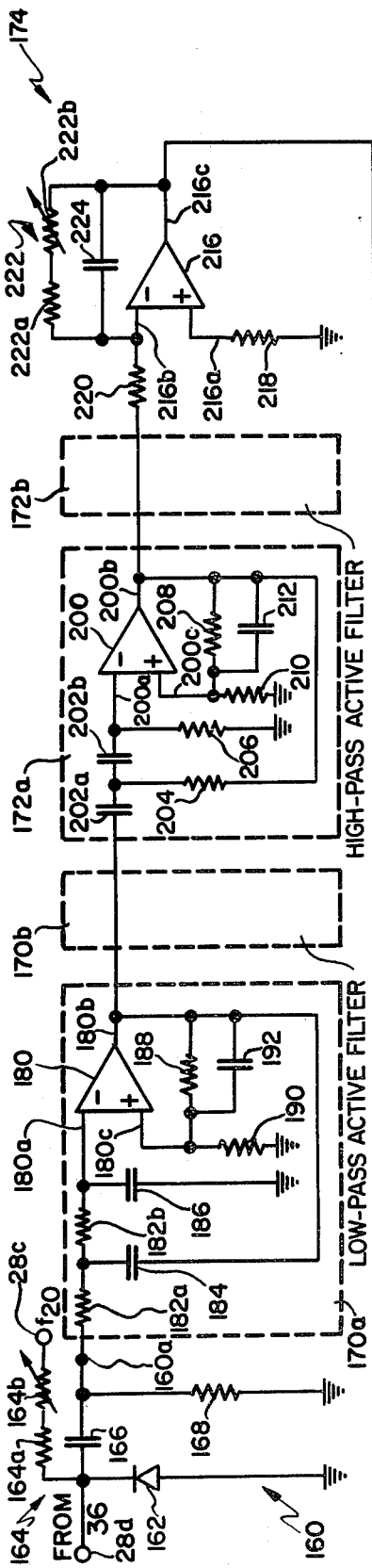
FIG. 3c is a schematic diagram of one presently preferred embodiment of a portion of a receiver front end and of a chirp FSK demodulator, for use in the data transceiver of FIG. 2.
Figure 3C:
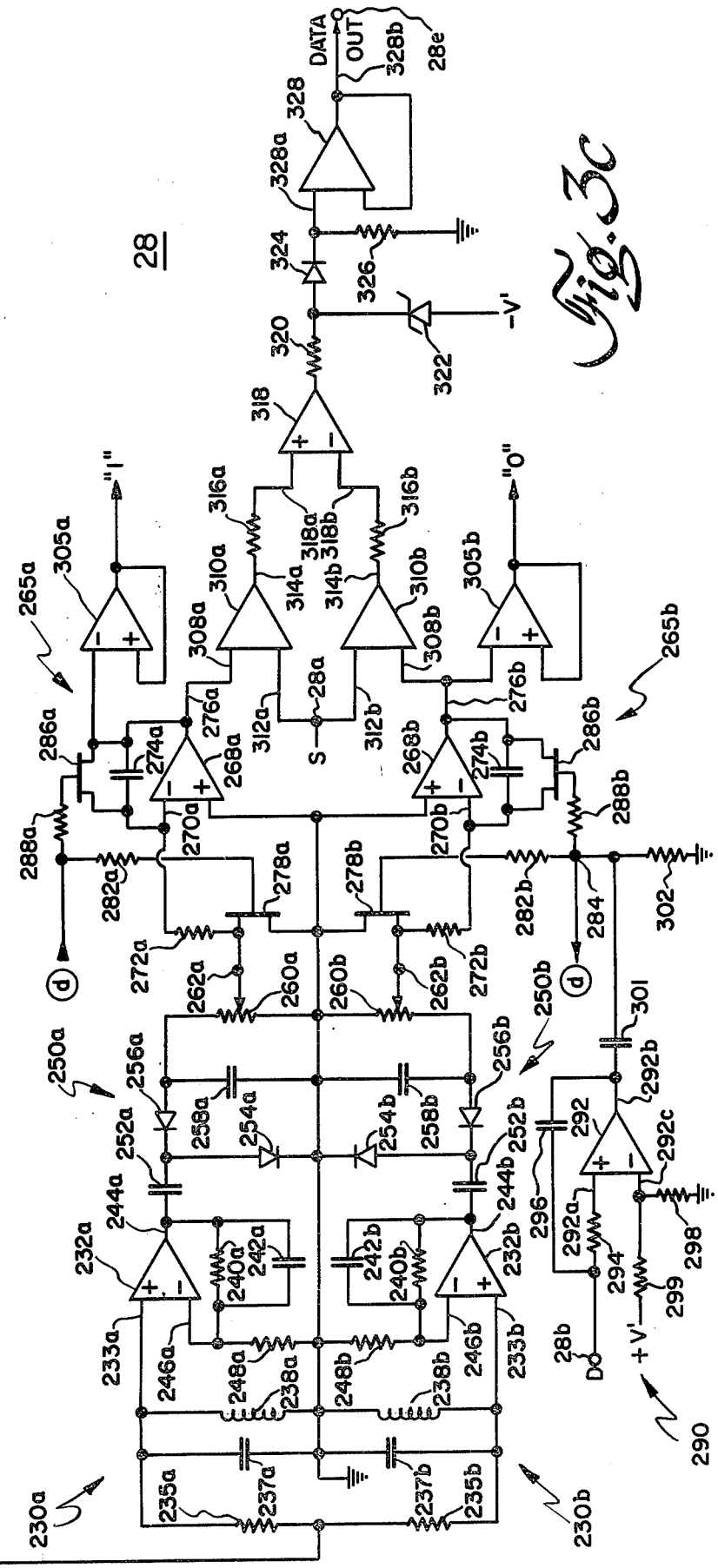

The chirped frequency-swept local oscillator waveform, locked to zero crossings of the power line waveform (and therefore synchronized with the data transmission frequency chirps of all other data transceivers connected to the same media) is coupled to data receiver portion LO input 28c (FIG. 3c). The received CFSK waveform, from the receiver coupler means and receiver front end means, is coupled to the input 28d of a frequency-conversion mixer means 160. In the illustrated mixer means 160, a single mixer diode 162 is connected from input 28d to ground potential. The local-oscillator voltage at input 28c is coupled to the diode through a local-oscillator level-setting resistance 164, illustratively comprising a fixed resistance element 164a and a variable resistance element 164b, to allow precise setting of the local oscillator injection voltage. The intermediate frequency voltage is coupled from mixer diode 162 via a coupling capacitance 166 and appears across a mixer load resistance 168.

Intermediate-frequency bandpass filtering is illustratively accomplished by passing the intermediate frequency signal through a pair of cascaded low-pass active filters 170a and 170b, thence through a pair of cascaded high-pass active filters 172a and 172b and a gain stage 174. Each of the low-pass filter stages 170 utilizes an operational amplifier 180, having a pair of filter resistance elements 182a and 182b in series connection between mixer output 160a and the inverting-input 180a of the operational amplifier. A first filter capacitance element 184 is connected from the junction of the filter resistors to the operational amplifier output 180b, while a second filtering capacitance 186 is connected from input 180a to ground potential. A first feedback resistance 188 is connected between output 180b and the non-inverting +input 180c of the amplifier, with a gain setting resistance 190 connected from input 180c to ground potential. A capacitive feedback-compensating element is connected across feedback resistance 188. In the high pass active filter stages 172, an operational amplifier 200 is used, with the inverting −input 200a thereof being connected to the stage input via a pair of series-connected capacitive filter elements 202a and 202b. A first filter resistance 204 is connected from the junction of the capacitive elements to the operational amplifier output 200b. A second filter resistance element 206 is connected from input 200a to ground potential. A feedback resistance element 208 is connected from amplifier output 200b to the noninverting +input 200c thereof, with a gain setting resistance element 210 being connected from input 200c to ground potential. A feedback-compensating capacitance 212 is connected across feedback resistance 208. Gain stage 174 also uses an operational amplifier 216, having the non-inverting input 216a thereof connected to ground potential through a compensating resistor 218 and having the inverting input 216b thereof connected to the output of second high-pass filter stage 172b, via an input resistance 220. Input 216b is connected to the amplifier output 216c by a resistance 222, preferably comprised of a fixed resistance portion 222a and a variable resistance portion 222b, whereby the feedback resistance magnitude is made variable to provide a variable amount of gain in stage 174. A frequency-compensating capacitor 224 is connected across the entire feedback resistance 222.

The frequency-converted, bandpass-filtered and amplified intermediate-frequency chirped waveform is applied simultaneously to the inputs of logic-one and logic-zero demodulators 230a and 230b, respectively. Each demodulator utilizes an operational amplifier 232a or 232b having the inverting input 233a or 233b, respectively, connected through an input resistance 235a or 235b to the demodulator common input. A tuned circuit comprised of a tuning capacitance 237a or 237b, shunting a tuning inductance 238a or 238b, is respectively connected between an inverting input 233a or 233b, and ground potential. Each of the tuned circuits comprised of a capacitor 237 and an inductor 238 is tuned to favor one of the i-f-zero or i-f-one frequencies, e.g. capacitance 237a and inductance 238a are tuned to a frequency about Δf above the center i-f frequency (or about 45 KHz. in the illustrated system) and capacitance 237b and inductance 238b are tuned to a frequency (e.g. 35 KHz.) which is the offset frequency below the center i-f frequency. By tuning the resonant circuits to frequencies above and below the i-f cenfter frequency, the relatively-low-Q tuned circuits will provide an attenuation for the undesired logic-state intermediate frequency which is at least 6 dB. greater than the attenuation provided for the desired logic-state intermediate frequency.

Each frequency shift demodulator also utilizes a feedback resistance 240a or 240b, paralleled by a frequency-compensation capacitance 242a or 242b, from the amplifier output 244a or 244b to the amplifier non-inverting input 246a or 246b, respectively. A gain-setting resistance 248a or 248b is respectively connected between ground potential and the non-inverting input 246a or 246b, respectively, of the associated amplifier. Each resulting output signal is coupled respectively to an associated voltage-doubling detector 250a or 250b, each comprising a series input capacitance 252a or 252b coupled to the anode of an associated shunt rectifier diode 254a or 254b, having the cathode thereof connected to ground potential. The anode of each shunt diode is connected to the cathode of a series rectifier diode 256a or 256b respectively, each having the anode thereof coupled to ground through a filter capacitance 258a or 258b, respectively. The output of each voltage-doubler rectifier 250a or 150b, respectively, appears across an associated potentiometer 260a or 260b, respectively. The logic-one demodulator output 262a and the logic-zero demodulator output 262b are each respectively coupled to the input of a logic-one or logic-zero matched filter 265a or 265b, respectively. Each matched filter utilizes an operational amplifier 268a or 268b, respectively, having an inverting input 270a or coupled through a series input resistance 272a or 272b to the associated demodulator potentiometer wiper arm output 262a or 262b, respectively. An integrating capacitor 274a or 274b is respectively connected between the inverting input 270a or 270b, respectively, of the operational amplifier and the respective output 276a or 276b. The input end of respective resistors 272a is controllably shunted to ground potential by the source-drain circuit of an associated field-effect switching transistor 278a or 278b. The gate electrode of the switching field-effect transistor is respectively connected through a gate resistance 282a or 282b to a dump-driver terminal 284. The source-drain circuit of another field-effect switching transistor 286a or 286b, respectively, shunts the associated one of respective integrating capacitors 274a or 274b. The gate electrodes of devices 286a and 286b are respectively connected to the dump-driver terminal 284 through respective gate resistors 288a or 288b.

The dump-driver terminal 284 is driven by a circuit 290 receiving the detector dump D waveform (from FIG. 3a at input 28b). This waveform is applied to the non-inverting input 292a of an operational amplifier 292, through an input resistance 294. The D waveform is also applied through a compensating capacitor 296 to the operational amplifier output 292b. The operational amplifier inverting input 292c is connected to ground potential through a resistance 298 and is also connected to operating potential $+V'$ to another resistance 299. The operational amplifier output 292b is connected through a coupling capacitance 301, such that the buffered dump D waveform appears across resistance 302 and therefore at dump-driver terminal 284.

For use in systems requiring collision detection, a pair of voltage-follower buffers 305a or 305b are provided by connection of operational amplifier inverting inputs to the respective integrator outputs 276a or 276b. These outputs 276a or 276b are also respectively connected to one input 308a or 308b of associated one of a pair of sample gates 310a or 310b. The remaining inputs 312a and 312b, respectively, of the gates are connected to input 28a to receive the detector sample S signal from the clock circuitry of FIG. 3a. The sampled gate outputs 314a or 314b are respectively connected through respective resistance elements 316a or 316b to the respective non-inverting input 318a and inverting input 318b of a comparator amplifier 318. The comparator amplifier output 318c is connected through a series resistance 320 to the cathode of a zener diode 322, having its anode connected to the source of negative operating potential $-V'$. The junction of resistance element 320 and zener 322 is connected to the anode of a diode 324, having its cathode connected to a resistance element 326 (to ground potential), and also to the input of a unity-gain, non-inverting voltage-follower 328, at the output 328b of which is provided the DATA OUT signal to be made available at receiver output 28e.

In operation, the A.C. voltage at output 244a or 244b, and applied to the respective voltage-doubling rectifier 250a or 250b, will be of amplitude dependent upon the intermediate frequency received, due to the presence of tuned circuits 237a/238a or 237b/238b. Therefore, the logic-one demodulator output 262a voltage will be more negative when a logic-one intermediate frequency signal has been received and will be more positive when a logic-zero intermediate frequency signal has been received. Conversely, the voltage at the logic-zero demodulator output 262b will be more positive than a logic-one intermediate frequency signal is received and more negative when a logic-zero intermediate-frequency signal is received. The D.C. voltages at inputs 262a and 262b are integrated, starting immediately after a dump D pulse has occurred. During the presence of the dump D pulse, the more positive voltage at dump-driving point 284 turns on all four of devices 278a, 278b, 274a and 274b, connecting the integrator inputs to ground and discharging the integrator capacitors 274a and 274b. Upon termination of the dump D pulse, the respective detector output D.C. levels are applied to the respective integrator inputs and the respective integrator capacitors allowed to charge. The respective integrator outputs 276a and 276b have ramp waveforms thereon, of magnitude dependent upon the intermediate frequency presently being received. At the end of a bit time interval, the sample S pulse occurs and allows the normally-nonconductive sample gates 310a and 310b, to conduct. The integrator output voltages are accordingly applied to the inputs of comparator 318. Dependent upon the magnitude of the logic-one and logic-zero integrator outputs 276a and 276b, respectively, at the time of the occurrence of the sample S pulse, the comparator output 318b will be more positive in magnitude when a logic-one chirp has been received and will be more negative in magnitude when a logic-zero chirp has been received. The comparator output voltage is level-shifted and buffered in voltage follower 328, and the recovered binary data signal made available from the receiver.

While one presently preferred embodiment of our novel method of, and system for, using novel chirp frequency-shift-keyed modulation for data transmission over media having interfering signals, has been described herein, many variations and modifications will now become apparent to those skilled in the art. In particular, it will be seen that non-binary data, such as octal, decimal, hexadecimal and the like data codings, can be used, by assigning different offset frequency values to each data condition; "grey scale" information can thus be transmitted as multilevel digital data. Each data condition may be transmitted with equal or unequal frequency offsets, which may also be used in the binary data case. Further, the frequency chirps may be equally as well used in the decreasing direction, with increasing time during a bit time interval, and may be swept in alternating directions (e.g., increasing, then decreasing) in alternating bit time intervals. It is our intent, therefore, to be limited only by the scope of the appending claims, and not by the specific details provided by way of description herein.

What is claimed is:

1. A method for transmission of digital data, comprising the steps of:
   (a) transmitting a carrier having a selected substantially-constant initial frequency $f_c$;
   (b) providing a sequence of substantially-constant data bit time intervals, each commencing essentially at the termination of the previous data bit time interval, and during each of which one bit of said digital data is to be transmitted;
   (c) offsetting the carrier initial frequency, at the start of each data bit transmission time interval, by an offset frequency $\Delta f$ established only by the data value of the data bit to be transmitted in that data bit time interval; and
   (d) frequency sweeping the offsetted carrier frequency in a predetermined direction, unrelated to the data value, for the duration of the data bit time interval.

2. The method of claim 1, wherein step (d) includes the step of substantially continuously varying the carrier frequency during frequency sweeping.

3. The method of claim 2, wherein the swept frequency is substantially linearly changed with respect to time during the data bit time interval.

4. The method of claim 3, wherein the carrier frequency is swept to increasing frequencies with increasing time after the start of the data bit time interval.

5. The method of claim 3, wherein the carrier frequency is swept to decreasing frquencies with increasing time after the start of the data bit time interval.

6. The method of claim 3, wherein the carrier frequency is swept during each data bit time interval in an opposite direction from the swept direction used in the preceeding data bit time interval.

7. The method of claim 1, wherein the initial carrier frequency $f_c$ is on the order of 100 Khz.

8. The method of claim 1, wherein the offsetting frequency $\Delta f$ is on the order of one order of magnitude less than the carrier frequency $f_c$.

9. A method for transmission of digital data, comprising the steps of:
(a) transmitting a carrier of a selected initial frequency $f_c$;
(b) offsetting the carrier frequency to different sides of the initial carrier frequency $f_c$, at the start of a data bit time interval, by an offset frequency $\Delta f$ established by the different data values of the bit of data to be transmitted; and
(c) frequency sweeping the offsetted carrier frequency in a predetermined direction for the duration of the data bit time interval.

10. The method of claim 9, wherein equal numbers of discrete value of carrier frequency offset $\Delta f$ occur above and below the initial carrier frequency $f_c$.

11. The method of claim 10, wherein binary digital data is transmitted; a first binary data condition causing the initial frequency to be above the initial carrier frequency; the remaining binary data condition causing the initial frequency to be below the initial carrier frequency.

12. The method of claim 10, wherein the carrier frequency is swept to increasing frequency values with increasing time, during the data bit time interval.

13. The method of claim 12, wherein the transmitted frequency is substantially continuously varying during frequency sweeping.

14. The method of claim 13, wherein the swept frequency is substantially linearly varied with respect to time.

15. The method of claim 10, wherein the initial carrier frequency is on the order of 100 KHz.

16. The method of claim 15, wherein the offsetting frequency is on the order of one order of magnitude less than the carrier frequency.

17. The method of claim 16, wherein the offsetting frequency is a multiple of the inverse of the data bit time interval.

18. The method of claim 1, wherein the carrier frequency is swept to a final frequency, at the end of each data bit time interval, which is on the order of twice the initial carrier frequency.

19. The method of claim 1, further including the step (e) of coupling the transmitted swept carrier, at a first location, to a transmission medium.

20. The method of claim 19, further including the step (f) of receiving the swept frequency transmission at a second location, different from said first location; and step (g) recovering the transmitted digital data value from the frequency swept waveform received at the second location.

21. The method of claim 20, wherein the recovering step (g) includes the steps of: (h) converting the swept carrier frequency waveform to a single signal at a predetermined intermediate frequency; (i) detecting the magnitude of the frequency-converted received waveform at predetermined frequencies above and below the intermediate frequency; and (j) comparing the detected magnitudes to determine the originally-transmitted digital data value.

22. The method of claim 21, wherein step (h) includes the steps of: providing a single local oscillator signal of frequency swept in the same direction as the swept transmission frequencies; synchronizing the single local oscillator frequency sweep to the data bit time interval; and mixing the received carrier and single local oscillator signal to derive a single intermediate-frequency signal.

23. Apparatus for communicating digital data over a transmission media by chirp frequency-shift-keying modulation, comprising:
means receiving the digital data to be transmitted for providing a waveform having an initial frequency offset from a substantially-constant carrier center frequency responsive to the digital data value to be transmitted and for changing frequency in a predetermined manner, unrelated to the digital data value, during a data bit time interval;
means for coupling the changing frequency waveform to said transmission medium;
means coupled to said transmission medium for receiving said changing frequency waveform; and
means for demodulating the received changing frequency waveform to recover the transmitted digital data value.

24. The apparatus of claim 23, wherein said waveform-providing means includes: oscillator means having a control input for providing a signal having a frequency responsive to the magnitude of a control input signal at said control input; first means for providing a frequency offset signal responsive to the digital data value to be transmitted; second means for providing a ramp signal commencing substantially at the beginning of said data bit time interval, changing during said data bit time interval only in a single direction unrelated to said digital data value being transmitted, and terminating substantially at the end of said data bit time interval; and means for combining the signals from the first and second means to provide said control input signal to said oscillator means.

25. The apparatus of claim 24, further comprising means for varying the magnitude of the control input signal to vary the initial center frequency of said oscillator means.

26. The apparatus of claim 24, wherein said second means is an integrator having an output at which said ramp signal appears, said integrator being adapted to be reset to a substantially-constant initial value at least prior to the start of each data bit time interval.

27. The apparatus of claim 23, further comprising third means for providing a data bit time interval synchronizing signal at said waveform-providing means and at said demodulating means.

28. Apparatus for communicating digital data over a transmission medium by chirp frequency-shift-keying modulation, comprising:
  means receiving the digital data to be transmitted for providing a waveform having an initial frequency offset from a carrier center frequency responsive to the digital data value to be transmitted and changing frequency in a predetermined manner during a data bit time interval;
  means for coupling the changing frequency waveform to said transmission medium;
  means coupled to said transmission medium for receiving said changing frequency waveform;
  means for demodulating the received changing frequency waveform to recover the transmitted digital data value; and
  means for receiving a predetermined signal available on said media and utilizing said media signal to provide a data bit time interval synchronizing signal at said waveform-providing means and at said demodulating means.

29. The apparatus of claim 28, wherein said media is a power line, said predetermined signal is the A.C. power waveform, and said third means utilizes zero crossings of said A.C. power line signal for providing the synchronizing signal.

30. The apparatus of claim 29, wherein a predetermined number of bits of digital data are transmitted over said media between sequential occurrences of said synchronizing signal.

31. The apparatus of claim 23, wherein said demodulating means includes: mixer means receiving a single swept local oscillator frequency waveform and said received changing frequency waveform to provide a single intermediate-frequency waveform; and means for demodulating the single intermediate-frequency waveform to recover the transmitted digital data value.

32. The apparatus of claim 31, wherein said waveform providing means includes means for shifting the carrier center frequency, during reception of said changing frequency waveform from said transmission medium, to provide the local oscillator frequency waveform.

33. The apparatus of claim 31, further comprising means for amplifying the intermediate-frequency waveform from said mixer means.

34. The apparatus of claim 33, further comprising means for bandpass filtering the intermediate-frequency waveform.

35. Apparatus for communicating digital data over a transmission media by chirp frequency-shift-keying modulation, comprising:
  means receiving the digital data to be transmitted for providing a waveform having an initial frequency offset from a carrier center frequency responsive to the digital data value to be transmitted and changing frequency in a predetermined manner during a data bit time interval;
  means for coupling the changing frequency waveform to said transmission medium;
  means coupled to said transmission medium for receiving said changing frequency waveform; and
  means for demodulating the received changing frequency waveform to recover the transmitted digital data value, and including: mixer means receiving a swept local oscillator frequency waveform and said received changing frequency waveform to provide an intermediate-frequency waveform; and intermediate-frequency waveform demodulator means including: at least one means for providing a substantially D.C. voltage responsive to receipt of each intermediate frequency representing a digital data value; means for integrating the substantially D.C. voltage from each of the voltage-providing means; means for resetting each integrating means prior to the start of each data bit time interval; means for sampling the output of each integrating means at the end of each data bit time interval; and means for comparing the sampled integrator means outputs for determining the digital data value received.

36. A system for carrier frequency communication of serial information bits representative of a plurality of logic states, at a carrier frequency substantially greater than the frequency of information bit transmission, comprising:
  transmitting means, adapted for connection to an alternating-current power line transmission medium, comprising:
    means for modulating a transmission signal of frequency substantially greater than the frequency of information bit transmission, responsive to the logic state of the information bits to be transmitted;
    means for producing predetermined variations of frequency in said transmission signal during each time interval in which an information bit is transmitted, to cause the variations to extend over a frequency range substantially greater than the frequency of information bit transmission; and
    means for synchronizing said predetermined frequency variations with the alternating current on the power line; and
  receiving means adapted for connection to the power line transmission medium, comprising:
    means for receiving the transmission signal;
    means for providing local signals related to the predetermined frequency variations of said transmission signals during each bit time interval and synchronized with the alternating current in the power line; and
    means for utilizing said local signal to recover the serial information bits representative of each of the plurality of logic states.

37. The system of claim 36, wherein said frequency-variation-producing means causes the predetermined frequency variations of said transmission signal during each bit time interval to extend over a frequency range that is at least 10 times greater than the frequency of information bit transmission, to immunize the transmission signal from interferring continuous-wave signals on the power line transmission medium.

38. The system of claim 37, wherein said synchronizing means uses the zero crossings of the alternating current on the power line to provide synchronization.

39. The system of claim 38, wherein a plurality of data words, each comprising a predetermined plurality of information bits, is serially transmitted with the transmission of each data word being synchronized to the alternating current on the power line.

40. The system of claim 39, wherein each data word extends over a predetermined portion of one cycle of the alternating current on the power line.

41. The system of claim 37, wherein a plurality of data words, each comprising a predetermined plurality of information bits, is serially transmitted with the transmission of each data word being synchronized to the alternating current on the power line.

42. The system of claim 41, wherein each data word extends over a predetermined portion of one cycle of the alternating current on the power line.

43. The system of claim 37, wherein said transmitting means and said receiving means are combined in a unitary transceiving apparatus which is selectively utilized for transmission and reception, and wherein said transmitting means and said local-signal-providing means in said receiving means comprise a common frequency-generating means for providing, during each bit interval, predetermined frequency variations synchronized with the alternating current on the power line.

44. The system of claim 36, wherein said transmitting means and said receiving means are combined in a unitary transceiving apparatus which is selectively utilized for transmission and reception, and wherein said transmitting means and said local-signal-providing means in said receiving means comprise a common frequency-generating means for providing, during each bit interval, predetermined frequency variations synchronized with the alternating current on the power line.

45. Transmitting apparatus for high frequency transmission of serial information bits of a plurality of logic states over alternating-current power lines, comprising:
  first means adapted for coupling to one of said power lines and responsive to alternating current signals on that power line for producing high-frequency transmission signals having, during each bit time interval of the serial information bits, a predetermined frequency variation synchronized to the alternating current signal on that power line, to cause the transmission signal to vary during each bit time interval over a frequency range that is substantially greater than the frequency at which consecutive information bits recur; and
  second means responsive to the serial information bits to be transmitted for causing the transmission signal to have a unique predetermined frequency pattern for transmitted information bits of each one of the plurality of logic states.

46. The transmitting apparatus of claim 45, wherein said first means comprises: synchronizing means for generating a train of timing pulses synchronized to the alternating current on the power line to establish the bit time intervals of the information bits to be transmitted.

47. The transmitting apparatus of claim 46, wherein said synchronizing means comprises: means responsive to said timing pulses for generating signals having predetermined voltage variations during each bit time interval; and oscillating means responsive to said voltage-variation signals for producing signals having predetermined frequency variations during each bit time interval.

48. The transmitting apparatus of claim 47, wherein said generating means comprises active integrating means controlled by said timing pulses.

49. Receiving apparatus for recovering serial information bits, each capable of having any one of a plurality of logic states, encoded on a high-frequency transmission signal transmitted over an alternating current power line, comprising:
  first means adapted for coupling to the power line for receiving a high-frequency transmission signal having predetermined wide variations in frequency, time-synchronized to the alternating current on the power line, during each bit time interval of the serial information bits encoded thereon;
  second means adapted for coupling to the power line and responsive to alternating current thereon for producing a variable local frequency signal time-synchronized to the power line alternating current and varying in frequency in a uniform predetermined manner during each bit time interval of the information bits encoded on the transmission signal; and
  demodulating means for mixing the high-frequency transmission signal and the variable local frequency signal for providing an intermediate-frequency signal and for deriving therefrom information bit signals of an amplitude representative of the logic state of each respective one of the information bits.

50. The receiving apparatus of claim 49, wherein said demodulating means comprises: signal recovery means synchronized to the alternating current on the power line for improving the signal-to-noise ratio of the recovered information bit signals.

51. The receiving apparatus of claim 50 for recovering serially transmitted information bits of binary logic state; wherein the intermediate-frequency signal has a first frequency during the presence of a data bit at a first binary logic state and has a second frequency during the presence of a data bit of the remaining binary logic state; said demodulating means further comprising: first and second frequency-detecting means each for providing at an output thereof an amplitude signal representative of the presence of respective first and second binary logic state signals; and said signal recovery means comprises: integrating means for successfully integrating the output of each of the frequency detection means over each bit time interval; means for sampling the integrated output of each integrating means at the end of each bit time interval; and means for comparing the sampled values to provide a serial train of information bits having different amplitudes for different binary states.

52. The receiving apparatus of claim 51, wherein said integrating means and said sampling means are operated in synchronism to the alternating current on said power line.

53. The receiving apparatus of claim 52, wherein said signal recovery means further comprises: means synchronized to the alternating current on said power line for recurrently discharging the integrating means after the integrated output is sampled.

54. The receiving apparatus of claim 51, wherein said signal recovery means further comprises: means synchronized to the alternating current of said power line for recurrently discharging the integrating means after the integrated output is sampled.

* * * * *